J. G. HAYDEN.
PIPE SADDLE.
APPLICATION FILED MAR. 21, 1912.
1,178,234.
Patented Apr. 4, 1916.
3 SHEETS—SHEET 3.
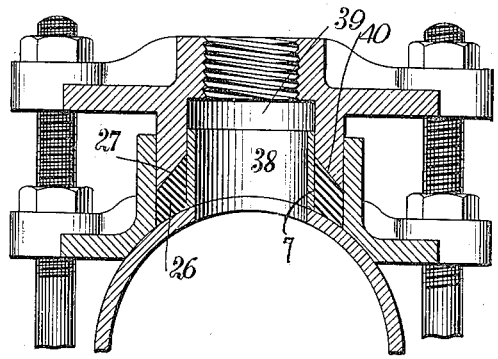
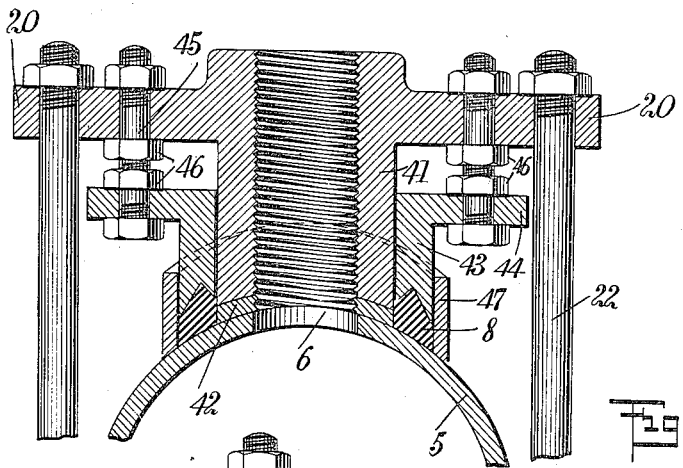
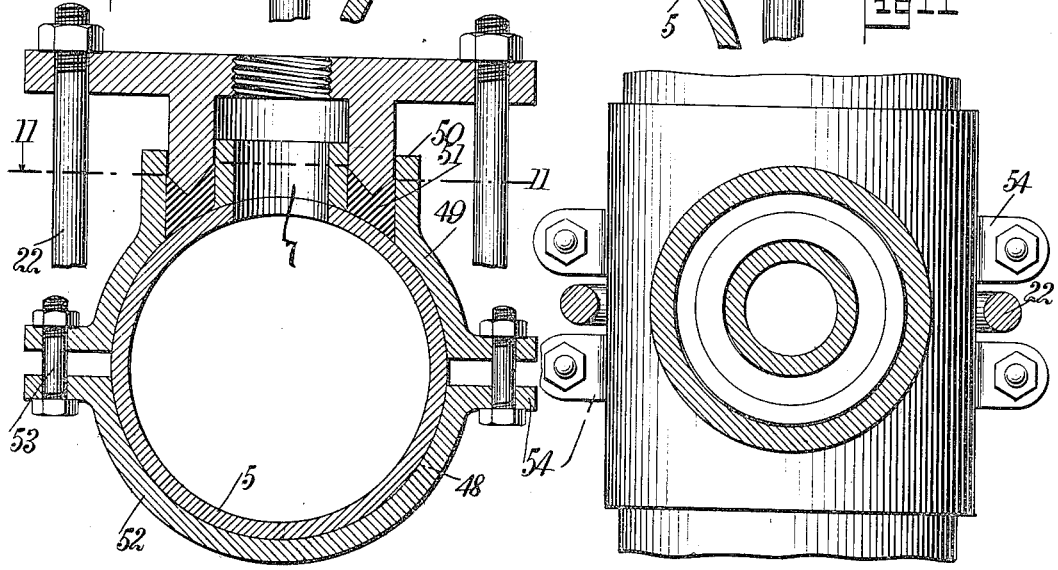
WITNESSES
O. J. Hachenberg.
W. S. Orton
INVENTOR
James G. Hayden
BY Munn & Co
ATTORNEYS

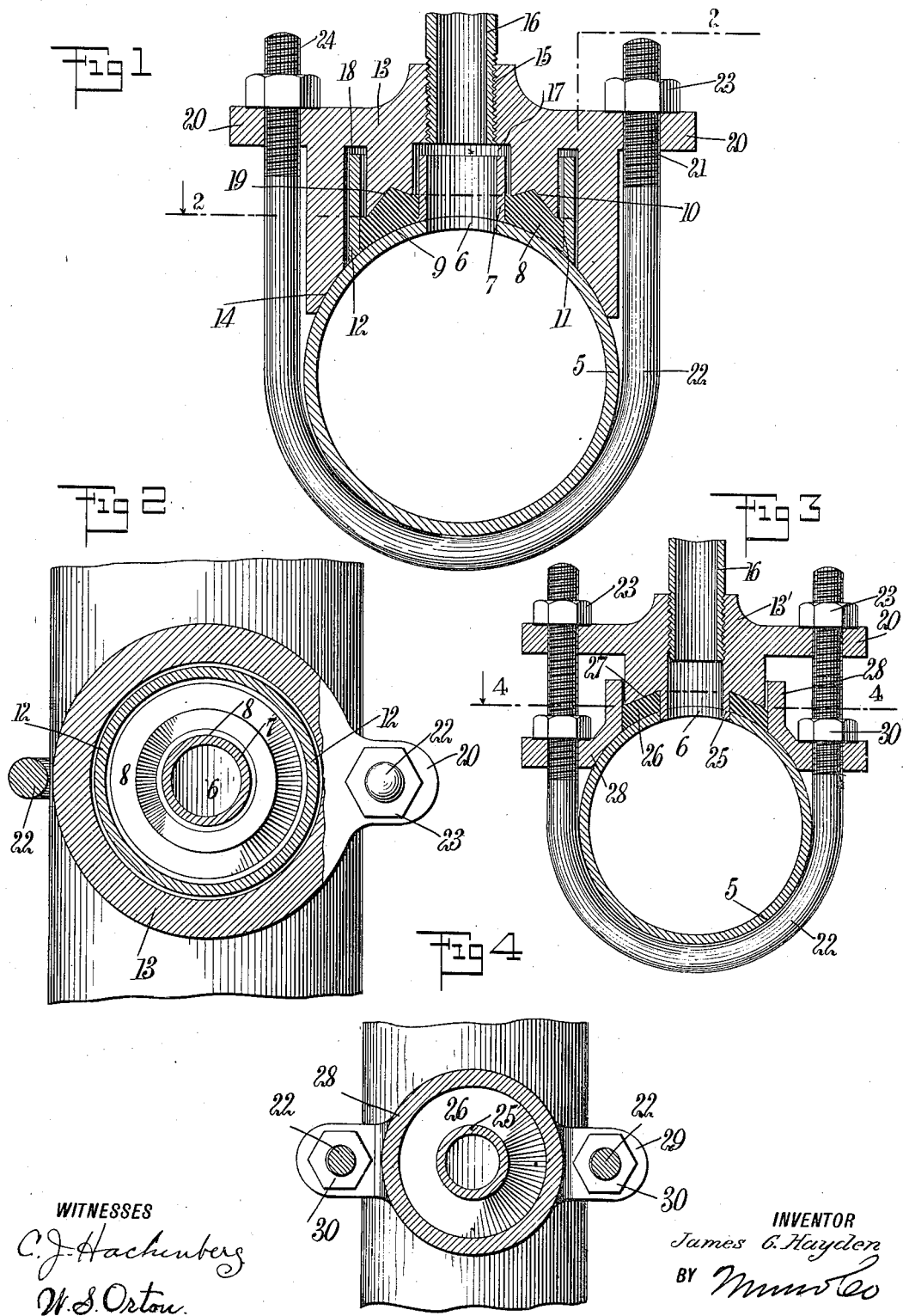

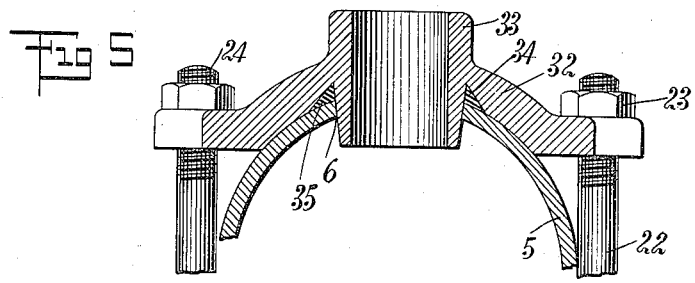
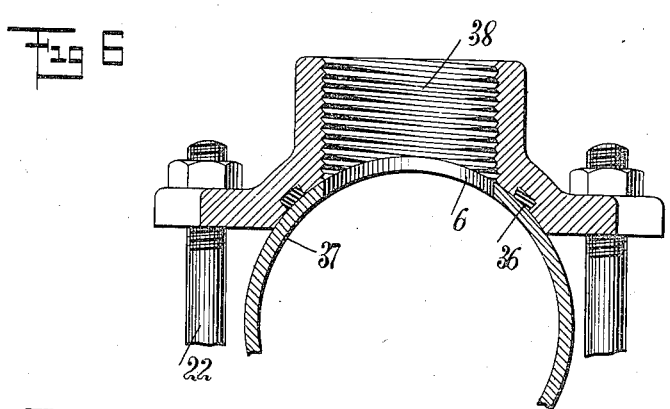
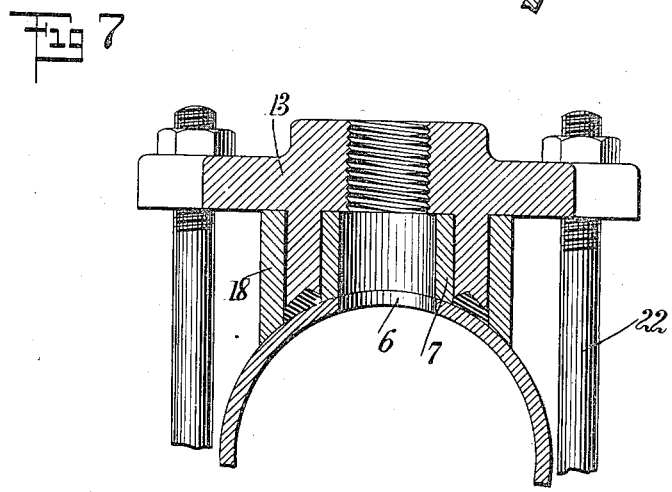

UNITED STATES PATENT OFFICE.

JAMES G. HAYDEN, OF NEW LEXINGTON, OHIO.

PIPE-SADDLE.

1,178,234.  Specification of Letters Patent.  Patented Apr. 4, 1916.

Application filed March 21, 1912. Serial No. 685,326.

*To all whom it may concern:*

Be it known that I, JAMES G. HAYDEN, a citizen of the United States, and a resident of New Lexington, in the county of Perry and State of Ohio, have invented a new and Improved Pipe-Saddle, of which the following is a full, clear, and exact description.

My invention relates to a new and improved form of pipe saddle adapted for pipes of different diameters.

In the common pipe saddle now in use, the saddles are made for different sized pipes having a gasket of uniform thickness, which gasket necessarily cannot make a tight joint when the pipes are variable in size.

An object of my invention is to eliminate the objections inherent to the old form of saddles, and to provide a connection which is absolutely tight, irrespective of the size of the pipe, or the inequalities of the surface of the same.

I attain the above-outlined object by constructing a saddle having a recessed pocket, disposed within which pocket is a gasket concentrically disposed relative to the opening in the pipe, said gasket adapted to be brought into firm engagement with the pipe by straps straddling the pipe.

Reference is to be had to the accompanying drawings, forming a part of this specification, in which similar characters of reference indicate corresponding parts in all the figures, and in which—

Figure 1 is a transverse sectional view through a preferred form of my invention, for high pressure work, and taken in a plane transversely of the pipe at the opening therein; Fig. 2 is a horizontal sectional view taken on the irregular line 2—2 of Fig. 1 and looking in the direction of the arrow; Fig. 3 is a view similar to Fig. 1, but showing a modified form of saddle connection, particularly adapted for high pressure work; Fig. 4 is a horizontal sectional view taken on the line 4—4 of Fig. 3 and looking in the direction of the arrow; Fig. 5 is a transverse sectional view taken through the upper portion of a low pressure pipe, showing a form of saddle thereon particularly adapted for low pressure work; Fig. 6 is a view similar to Fig. 5 but showing a modified form of this character of saddle; Fig. 7 is a similar view showing a form of saddle for any pressure pipe more particularly suited for medium and high pressures; Fig. 8 is a similar view showing a form of saddle for high pressure service; Fig. 9 is a similar view showing a form of saddle for high pressure pipes; and Fig. 10 is a similar view particularly showing a saddle for high pressure pipes having irregular circumferences, and Fig. 11 is a fragmentary transverse sectional view of the modification shown in Fig. 10 and taken on the line 11—11 thereof.

In the several figures, I have shown a pipe 5 having an opening 6 in its upper side. In the modifications shown in Figs. 1, 7, 8 and 10, there is a loose ring 7 outlining the opening 6 and extending some distance out from the same, concentrically disposed about which ring is a gasket 8, circular in plane, and the under surface 9 of which conforms substantially to the configuration of the upper face of the pipe 5. The upper face of the gasket 8 in the modifications shown in Figs. 1, 5, 7, 8 and 9, has a circular ridge 10 formed by upwardly-sloping sides extending from the bore and the outer side 11 of the gasket, and, as shown in Fig. 10, there is a circular depression 31 centrally disposed on the top of the gasket. Centrally disposed relative to the ring 7 and in engagement with the outer side of the gasket 8, is a sleeve 12, resting upon the top of the pipe 5 and of a height to bring it on a level with the top of the ring 7. By this construction, it will be noted that the gasket 8 is confined transversely between the ring 7 and the sleeve 12.

Adapted to rest lightly upon the pipe 5, is a saddle 13, the outer edge 14 of the face of which engages the pipe being of a configuration substantially that of the curvature of the pipe 5. A central screw-threaded bore 15 extends through the saddle, which bore is adapted to be engaged by a pipe 16, to afford a fluid communication with the interior of the pipe 5. The under side of the saddle 13 has a recess 17 centrally disposed relative to the bore 15, in which recess is adapted to be positioned the ring 7. A second circular recess 18 extends from the under side of the saddle 13 concentric relative to the recess 17, and adapted to contain the sleeve 12. The recesses 17 and 18 are of greater length than the height of their respective containing members, so as to permit relative movement between the saddle, the ring and the pipe 16. The under side of the saddle, between the recesses 17 and 18, has a circular groove 19, V-shaped in cross section adapted to engage the ridge, said ridge and groove 19 being of complementary form.

Extending outwardly from the saddle 13, is a pair of diametrically disposed brackets 20, which brackets each have an aperture 21 extending therethrough, said apertures adapted to receive a threaded end of a U-strap 22, which strap straddles the pipe 5 and is held in position by means of nuts 23 engaging the threaded end 24 and bearing on the top of the bracket 20. While but one strap has been described in connection with this device, it is, of course, obvious that two or any number of these straps may be used, to hold the saddle in position.

In the modification disclosed in Fig. 3, the ring 7 is constructed integral with the saddle 13' and forms a nipple 25 extending into the bore 6 of the pipe. Resting on the top of the pipe and concentrically disposed about the nipple 25, is a gasket 26, the top of which gasket is engaged by the recessed pocket 27 forming the under face of the saddle 13'. The gasket is prevented from outward movement by a ring 28, concentrically disposed about the gasket and saddle 13', the body portion of which rests upon the top of the pipe 5. In this case, the threaded leg of the strap 22 is relatively long and each leg of the strap passes through a bracket 29 extending outwardly from diametrically opposite sides of the ring 28. An additional set of nuts 30 is carried by the strap 22, one nut on each leg bearing upon the upper face of the bracket 29. In this construction, the gasket is disposed about the opening 6, the ring 28 is placed in position about the gasket and engages the pipe 5, the straps 22 are passed through the brackets 29 and firmly positioned on the pipe by seating the nuts 30 on said brackets. The saddle 13' is placed on the straps 22 and brought into engagement with the gasket 26 with the nipple 25 disposed within the opening 6. The nuts 23 will then force the saddle 13' firmly into engagement with the gasket 26, thereby forming, in this instance, a tight connection between the pipes 5 and 16.

In the modification disclosed in Fig. 5, the saddle 32 has extending centrally and transversely through the same, an integral nipple 33, the inner end of which nipple is adapted to protrude within the opening 6 in the pipe. Surrounding this inwardly projecting nipple at the point where it joins the body of the saddle, is a groove 34 of an inverted V shape in cross section, in which groove is adapted to be disposed a similarly-shaped gasket 35, which gasket bears on the pipe 5 outlining the opening 6. It will be seen that this is a relatively simple, inexpensive form of saddle, particularly adapted for low pressure service.

In the modification shown in Fig. 6, the gasket 36 is of uniform depth and is disposed away from the opening 6 and in the pipe-contacting part 37, which part substantially conforms to the outside curvature of the pipe. In this modification, the lower end of the nipple shown in Fig. 5, has been omitted and the threaded bore 38 of this form of saddle terminates at the opening 6.

The modifications disclosed in Figs. 7, 8 and 9 are preferably intended for high pressure service and it will be noted that the modification shown in Fig. 7 is similar to the saddle shown in Fig. 1, except that the band forming the outer edge 14 has been omitted. The parts of my invention, wherein loose sleeves are employed, may be assembled in various ways. A convenient way is to place the ring and sleeve on the pipe, with the ring around the opening thereof. Then place the packing on the pipe between the ring and sleeve, and then insert the tubular portion of the saddle into the space between the ring and sleeve and force it down onto the packing.

The modification shown in Fig. 8 resembles the modification shown in Fig. 3, except that the nipple 25 shown in this figure is replaced by a ring 38 extending into the concentrically disposed bore 39, which ring resembles the loose ring 7 hereinbefore described. In this instance, the top edge 40 of the gasket 26 has a relatively sharp inclined engaging face 27 with the saddle.

It is frequently desirable to make a connection with a high pressure pipe without shutting off the flow of fluid through said pipe, and in cases where this is attained with danger to the workmen, it is desirable to replace the gaskets without injury to the workmen and without interrupting the flow through the pipe. With the modification shown in Fig. 9, I attain this desideratum by constructing the saddle with a relatively long tube 41 adapted to surround the opening 6, disposed at the end of which tube and on the part of the pipe surrounding the opening 6, is a lead gasket 42. This lead gasket is permanently held in position by means of the straps 22, as is common with the other devices hereinbefore described. Slidably mounted upon and surrounding the tube 41 is a collar 43 having an outturned upper flange 44, passing through which flange and through the brackets 20 of the saddle, is a pair of threaded bolts 45, which bolts are engaged by bolts 46 bearing, respectively, upon the under side of the brackets 20 and the top of the flange 44, thereby acting to force the collar 43 away from the saddle proper. The collar 43 rests upon a replaceable gasket 8, preferably of rubber or similar material, and surrounding this gasket and the lower portion of said collar, is a loose collar 47, limiting the gasket in this outward movement. By this construction, it will be seen that the collars 47 and 43 may be raised and a new rubber gasket inserted, there always being between the workmen and the bore of the pipe, a lead gasket 42, so that even under extreme high pressure, the amount of gas escaping past the lead gasket 42, is not sufficient to inconvenience the workmen.

In the several saddles hereinbefore described, it has been found necessary to have a pipe more or less cylindrical in cross section, but in the modification disclosed in Fig. 10, a saddle is shown having parts adapted to fit an irregular pipe and tending in the case of distorted pipes, to restore said pipes to their original cylindrical form. This saddle resembles the saddles described with reference to Fig. 7, except that the gasket is held from outward movement by a two-part band 48 encompassing the pipe, the upper part 49 of which band has a portion 50 contacting with the outer edge of the gasket 51. The upper portion 49 and the lower portion 52 of the two-part member 48 are united by a bolt 53 passing through abutting ears 54 on each of said parts. By means of the bolts 53, the two parts may be drawn together, thereby tending to restore the encompassed pipe to its circular shape. In the modification shown in Fig. 10, the contacting surface of the top of the gasket with the saddle, is similar to that described with reference to Fig. 1, with the exception that it is reversed, that is, the pointed edge in this instance is carried by the saddle instead of by the gasket. Instead of one pair of coacting ears 54, two or more pairs with their coacting bolts may be used, as shown in Fig. 11, and in that case, the binding strap 22 may be disposed between two adjacent ears 54.

Having thus described my invention, I claim as new and desire to secure by Letters Patent:

1. A pipe saddle adapted to be secured upon a pipe over an opening therein, comprising a member having a threaded opening and provided with a depending tubular portion around said opening and having a V-shaped recess in its end, the bore of the tubular portion being of greater diameter than that of the threaded opening, a packing having a ridge on its upper face to fit in said recess, a ring in the tubular portion of said member and adapted to rest upon the pipe around the opening thereof, and a sleeve surrounding the tubular portion of said member and adapted to rest upon the pipe, the sleeve being of a length to extend to and be engaged by said member.

2. A pipe saddle adapted to be secured upon a pipe over an opening therein, comprising a member having a threaded opening and provided with a depending tubular portion around said opening and having a recess in its end, the bore of the tubular portion being of greater diameter than the threaded opening, a packing having its upper face shaped to fit in the recess of the tubular portion of the member, a ring in the said tubular portion and adapted to rest upon the pipe around the opening thereof, and a sleeve surrounding the said tubular portion and adapted to rest upon the pipe.

In testimony whereof I have signed my name to this specification in the presence of two subscribing witnesses.

JAMES G. HAYDEN.

Witnesses:
I. J. SMITH.
JOHN W. DUGAN.

Copies of this patent may be obtained for five cents each, by addressing the "Commissioner of Patents Washington, D. C."